(No Model.) 3 Sheets—Sheet 1.
C. W. SIEMENS.
Glass-Melting Furnace.

No. 230,667. Patented Aug. 3, 1880.

Witnesses: Inventor:
C. William Siemens
by Chas. J. Whitman Att'y (No Model.) 3 Sheets—Sheet 2.

C. W. SIEMENS.
Glass-Melting Furnace.

No. 230,667. Patented Aug. 3, 1880.

(No Model.) 3 Sheets—Sheet 3.
C. W. SIEMENS.
Glass-Melting Furnace.
No. 230,667. Patented Aug. 3, 1880.
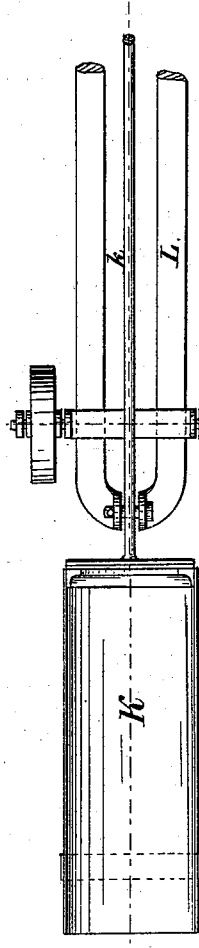
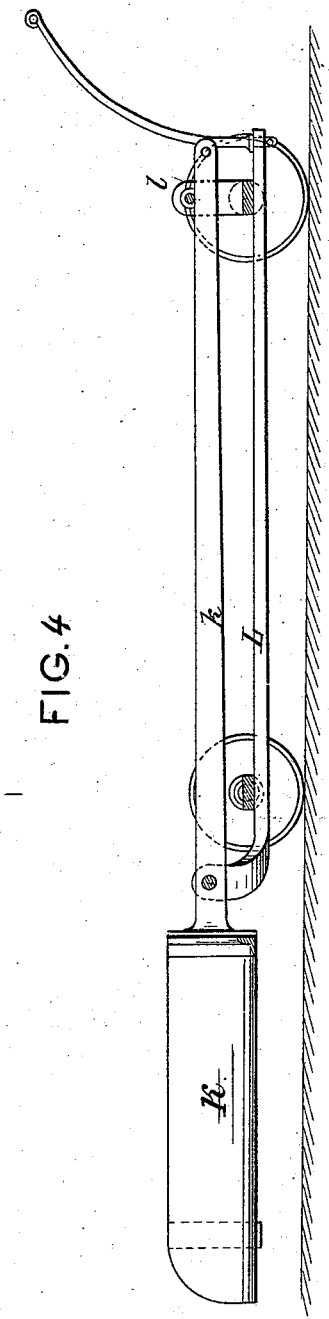
Witnesses: Inventor.

UNITED STATES PATENT OFFICE.

CHARLES WILLIAM SIEMENS, OF WESTMINSTER, ENGLAND.

GLASS-MELTING FURNACE.

SPECIFICATION forming part of Letters Patent No. 230,667, dated August 3, 1880.

Application filed June 14, 1880. (No model.) Patented in England April 28, 1875.

*To all whom it may concern:*

Be it known that I, CHARLES WILLIAM SIEMENS, of Westminster, England, have invented certain Improvements in the Construction and Methods of Working Glass-Melting Furnaces, (for which I have obtained a patent for Great Britain, No. 1,551, bearing date the 28th day of April, in the year of our Lord 1875,) of which the following is a specification.

Formerly in the manufacture of glass the materials were first charged into glass pots or tanks, then melted down, and then worked out completely, after which they were recharged and the process repeated.

The loss of time and other disadvantages resulting from this method of working were, in a measure, obviated by the new process and apparatus described in Letters Patent of the United States No. 127,806, granted to me on the 11th day of June, in the year of our Lord 1872, in which was described a regenerative tank-furnace for the continuous melting of glass, constructed with transverse partitions dividing the tank into compartments, through which the melted materials were made to flow, while the gas and air ports were arranged along each side of the tank so as to cause the flame to play transversely across the same. By the use of the continuous-melting furnace a full and uninterrupted melting-heat could be employed and no time was lost in cooling and settling the metal and reheating the furnace. The tank was rendered more durable by being subjected to a uniform temperature, and an economy in labor was effected in lessening the number of workmen required for the melting operations.

My present invention relates to continuous glass-melting furnaces of this class; and my improvement consists in placing the regenerators at the sides of the tank and forming an open cave below the tank, communicating with air-spaces on each side thereof, for the purpose of cooling the bottom and sides and receiving such metal as may leak through in an open accessible space.

It also consists in a scoop of peculiar construction for feeding raw materials to the glass-melting tank.

Figure 1:
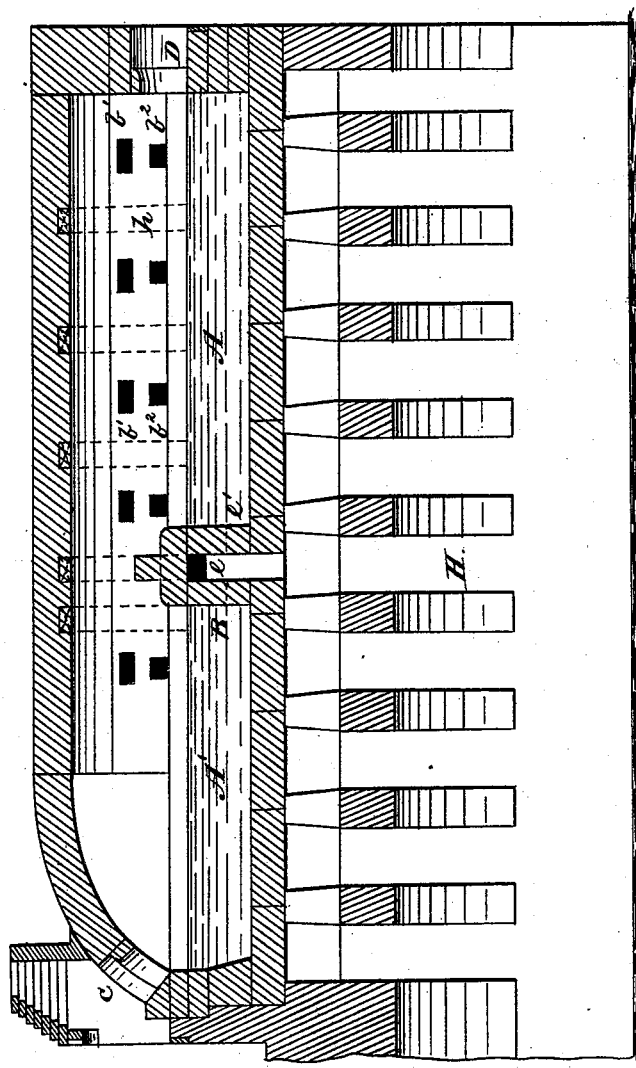
Figure 2:
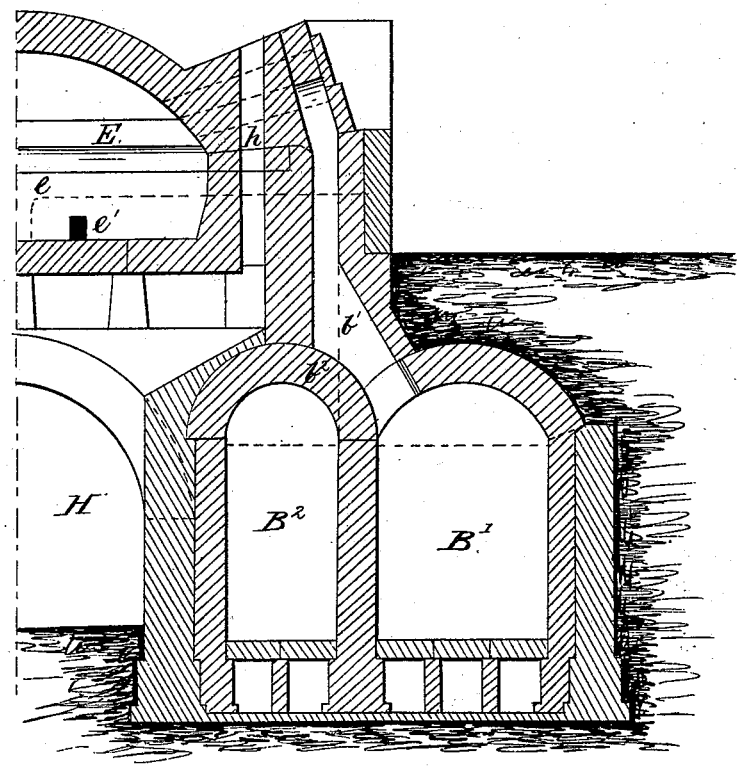

In the accompanying plate of drawings, in which corresponding parts are designated by similar letters, Figure 1 is a longitudinal vertical section of the continuous glass-melting furnace, and Fig. 2 a partial transverse vertical section of the same. Figs. 3, 4, and 5 illustrate a scoop for feeding materials to the glass-melting tank.

A is the melting-compartment, separated from the working-out compartment A' by the bridge E, which is formed with an air-flue, $e$, for cooling, and with passages $e'$ for the molten metal.

A pair of regenerators, B' B'', are placed at each side of the furnace, communicating with it by the flues $b'$ $b^2$, between which cooling air-flues $h$ are formed in the side walls, these flues rising from a cold-air chamber or cave, H, formed beneath the tank.

D is the feeding-door, and C the working-out holes.

The usual mode of charging furnaces of this description by shoveling in the materials or batch gives rise to the formation of a considerable amount of dust, which attacks the sides and roof of the furnace, and is partially deposited in the regenerators, causing them to clog up. I remedy this evil by the use of the scoop illustrated in Figs. 3 and 4.

The scoop K is fixed at the end of a bar, $k$, which is jointed to the front part of the truck L, the back end of the bar being kept down by a pin, $l$. The scoop K being charged with raw materials, the truck is run forward till the scoop is introduced through the feeding-door, whereupon the pin $l$ is removed, and, by means of the bar $k$, the scoop is canted to an inclined attitude, allowing the material to slide gently therefrom into the melting-chamber.

Having thus described my invention, I claim and desire to secure by Letters Patent of the United States—

A continuous glass-melting furnace having the regenerators at the sides of the tank and an open cave below the tank communicating with air-spaces on each side thereof, as and for the purposes described.

C. WILLIAM SIEMENS.

Witnesses:
   CHAS. ROCHE,
   THOS. MARCH,
*Both of 2 Waterloo Place, Pall Mall, London, Notary's Clerks.*